2,848,365

PURIFICATION OF NEOMYCIN BY CHROMATOGRAPHY

William G. Jackson, Kalamazoo, Mich., assignor to The Upjohn Company, Kalamazoo, Mich., a corporation of Michigan No Drawing. Application March 13, 1950
Serial No. 149,463

1 Claim. (Cl. 167—65)

This invention relates to a process for the purification of neomycin utilizing a chromatographic technique.

I have discovered that neomycin can be purified by passing an aqueous solution of crude neomycin into a zone of acid-washed, heat-activated wood charcoal, followed by elution with water, which first removes inorganic salts and then purified neomycin from said zone.

A preferred mode of the invention contemplates the use of a packed column containing acid-washed, heat-activated wood charcoal and an inert diluent, such as diatomaceous earth and the like. However, other modes of operation, such as agitating said charcoal with a solution of neomycin, separation of the charcoal carrying adsorbed neomycin, followed by washing the cake with water, and the like can also be used.

The process of the invention can be used for the further purification of crude preparations of neomycin, which contain up to about 75 percent impurities, but is most advantageously used to prepare pure neomycin from solutions of neomycin containing approximately fifty percent or less impurities. Various concentrations of neomycin can be used in the process, concentrated solutions containing between 10,000 and about 60,000 units of neomycin per milliliter being preferred, since, among other reasons, it is more convenient and economical to operate with a minimum of solvent.

The ratio of neomycin to acid-washed, heat-activated charcoal is of critical importance since too high a ratio of charcoal to neomycin will decrease the amount of neomycin recovered due to the tenacious manner in which a certain proportion of the neomycin is held to the charcoal, while too low a ratio of charcoal to neomycin will decrease the amount of neomycin recovered due to incomplete adsorption of the crude neomycin onto the charcoal. Ratios as low as one gram of charcoal for 60,000 units of neomycin to as high as one gram of charcoal for 10,000 units of neomycin are operable, the preferred ratio being about one gram of charcoal for 12,000 to 20,000 units of neomycin.

Although the process is operable over a wide pH range, it is most convenient to operate at a pH of about 5.5 to 6.0, the pH of water when in contact with acid-washed wood charcoal. Under these conditions ordinary tap or distilled water can be used. The process of the invention operates with equal satisfaction at higher hydrogen-ion concentrations, but offers no advantage.

The addition of a water-miscible solvent to the aqueous eluent offers no advantage when pure neomycin is desired, for the addition of sufficient solvent to facilitate the complete removal of neomycin from the charcoal, also causes the removal of unwanted impurities, thus decreasing the purity of the neomycin eluate.

The contact time of the solvent with the charcoal is of some importance. If water is passed through the carbon zone too rapidly, equilibrium is not reached and much more water is needed to elute all of the neomycin. In a bed of carbon a flow rate of about 50 to 120 milliliters per hour per square inch has been found to be quite satisfactory.

Ordinarily, the process of the invention is conducted at room temperature and atmospheric pressure, but if desired a slightly elevated temperature and pressure can be used to facilitate the flow of liquid through the carbon, for example, when a column or bed of charcoal is used, or, preferably an inert "filter aid," can be used to facilitate the flow of liquid through the bed of charcoal.

Neomycin has been assayed for purity according to a modification of the method of Loo et al., J. Bact. 50, 701 (1945), wherein the bottom layer of nutrient agar has been omitted, and the nutrient agar containing the *B. subtilis* poured directly into a Petri dish. A paper disc is placed upon the cooled nutrient agar on which is poured the diluted neomycin preparation to be tested and the zone of inhibition of growth determined after eighteen hours. This method of assay gives the purity of neomycin by reference to a standard which has been arbitrarily set at between 180 and 200 units per milligram of pure neomycin. Assays on the crude material are somewhat indefinite as certain impurities cause erratic results. As the impurities are removed, the assay variation becomes less and the purity of the product as shown thereby is more dependable. Throughout this specification the quantity and purity of the neomycin is given either in units of neomycin per milliliter of solution or in neomycin per milligram of solids.

The following examples are given by way of illustrating the method of the present invention and are not to be construed as limiting.

EXAMPLE 1

A four-inch Pyrex column was packed with a slurry prepared by thoroughly mixing for one hour fifteen hundred grams of acid-washed activated wood charcoal and fifteen hundred grams of a diatomaceous earth filter aid. Water was added at the top of the column and put through at moderate pressure until the height of the carbon-diatomaceous earth mixture remained constant. When so prepared, the column had a liquid hold-up of seven liters. After the height of the activated carbon mixture had reached a constant level, the liquid level was allowed to fall to just above the top of the carbon and four hundred milliliters of a solution containing a total of approximately 24 million units of neomycin (208 grams of solid at an average purity of 114 units per milligram) was added to the top of the column. As this solution passed down the carbon column, it was followed by distilled water, 41 half-liter aliquot portions of effluent being collected at the bottom of the column at a rate of 25 milliliters per minute.

The portions of the eluate were collected and assayed for solids and neomycin. The first fourteen aliquots (seven liters) of effluent, which corresponds to the hold-up of the column, contained no solids and were discarded. The remaining fractions were assayed separately. The next four aliquot portions (two thousand milliliters) contained 33.4 grams of solids having no neomycin activity. This material, which amounted to 16 percent of the original solids, consisted of inorganic salts present as impurities in the original product. The next 500-milliliter fraction contained neomycin at so low a purity that it was discarded. The next 22 aliquots (eleven liters) of eluate contained most of the neomycin.

The course of the purification is shown in the following table:

TABLE I

| Fraction Number | Ml. | Solids, Grams | Percent | U./ml. | U./mg. | Percent of Original |
|---|---|---|---|---|---|---|
| Starting Material | 400 | 208 | 100 | 60,000 | 114 | 100 |
| 15 | 500 | 2.65 | 1.3 | | | |
| 16 | 500 | 16.10 | 7.7 | | | |
| 17 | 500 | 9.85 | 4.7 | | | |
| 18 | 500 | 4.80 | 2.3 | | | |
| 19 | 500 | 3.90 | 1.9 | 85 | | 0.2 |
| 20 | 500 | 5.65 | 2.7 | 1,025 | 90 | 2.1 |
| 21 | 500 | 8.30 | 4.0 | 2,120 | 120 | 4.4 |
| 22 | 500 | 8.25 | 395 | 2,650 | 160 | 5.5 |
| 23 | 500 | 8.15 | 3.9 | 3,112 | 191 | 6.5 |
| 24 | 500 | 7.15 | 3.4 | 2,830 | 198 | 5.9 |
| 25 | 500 | 5.55 | 2.7 | 2,415 | 217 | 5.0 |
| 26 | 500 | 4.20 | 2.0 | 1,880 | 224 | 3.9 |
| 27 | 500 | 3.40 | 1.6 | 1,615 | 238 | 3.4 |
| 28 | 500 | 3.05 | 1.5 | 1,265 | 208 | 2.6 |
| 29 | 500 | 2.20 | 1.1 | 1,315 | 300 | 2.7 |
| 30 | 500 | 2.55 | 1.2 | 1,150 | 225 | 2.4 |
| 31 | 500 | 2.35 | 1.15 | 1,025 | 218 | 2.1 |
| ... | ... | ... | ... | ... | ... | ... |
| 41 | 500 | 0.90 | 0.4 | 285 | 158 | 0.6 |

Fractions 20 to 41 were combined and evaporated to dryness. These was thus obtained 68 grams of solid assaying an average of 200 units of neomycin per milligram. Thus, 99.97 percent of the neomycin recovered averaged above the assay standard of pure neomycin. It is to be noted that, of the 208 grams of solids added to the column, 37.3 grams was eluted as ash and 68.0 grams of pure neomycin obtained. There thus remains on the column about 102 grams of solid material which is composed of about equal quantities of neomycin and impurities.

EXAMPLE 2

In a manner essentially as described in Example 1, a 2.54 by 28 centimeter column of carbon having a liquid hold-up of 120 milliliters was prepared from fifty grams of carbon and 170 milliliters of water under a pressure of ten pounds p. s. i. When the height of the column became stabilized, a solution of about 206,000 units of neomycin at a purity of 45.5 units per milligram of solid (4.54 grams) in 100 milliliters of water was introduced at the top of the column followed by water containing one percent acetone, the effluent being collected in one-milliliter portions.

The first 120 milliliters of effluent, corresponding to the original liquid in the column, contained no solids and was discarded. The next 116 milliliters contained 1.3 grams of solids (32 percent of the original) but no neomycin. The next 65 milliliters contained 124,000 units of neomycin (60 percent recovery) at a purity of about 261 units per milligram. No more neomycin was removed by further elution.

EXAMPLE 3

*Determination of maximum capacity of carbon for neomycin*

Three carbon columns were prepared and used for the purification of neomycin in a manner essentially as described in Example 2, water being used as the eluant.

The results are given in the following table:

TABLE II

| Column | Solids (kg.) | Assay, u./mg. | Carbon (lb.) | Neomycin (u.) carbon (g.) | g. | Yield u./g. | Percent [a] |
|---|---|---|---|---|---|---|---|
| 1 | 8.3 | 120 | 100 | 36,000 | 2,006 | 221 | 42.5 |
| 2 | 11 | 150 | 80 | 60,000 | 2,356 | 188 | 27 |
| 3 | 18.75 | 118 | 80 | 105,000 | 9,500 | 138 | 0 |

[a] Percent of original neomycin which is acceptable for clinical use.

It is to be understood that the invention is not to be limited to the exact details of operation as shown or described, as obvious modifications and equivalents will be apparent to one skilled in the art, and the invention is, therefore, to be limited only by the scope of the appended claim.

I claim:

A process for the purification of impure neomycin containing not more than fifty percent impurities comprising: passing an aqueous solution of said impure neomycin containing from 10,000 to 60,000 units of neomycin per milliliter into a column of acid-washed, heat-activated charcoal in the ratio of 10,000 to 60,000 units of neomycin for each gram of charcoal, eluting said column containing neomycin and associated impurities adsorbed thereon with an eluant selected from the class consisting of distilled water and tap water, collecting a neomycin-rich fraction, and recovering neomycin therefrom, said process being operated at a pH of about 5.5 to 6.0.

References Cited in the file of this patent

UNITED STATES PATENTS

| | | |
|---|---|---|
| 2,501,014 | Wintersteiner | Mar. 21, 1950 |
| 2,516,080 | Sobin | July 18, 1950 |
| 2,528,022 | Van Dolah | Oct. 31, 1950 |
| 2,538,479 | Snyder | Jan. 16, 1951 |
| 2,550,939 | Richardson | May 1, 1951 |
| 2,643,997 | Johnson | June 30, 1953 |

OTHER REFERENCES

Johnson et al.: Res. in Antibiotics, Symposium at Wash., D. C., Jan. 31–Feb. 1, 1957, 6 pp.

Amberlite: Monobed Deionization, June 1950., pub. by Rohm and Haas Co., The Resinous Prod. Div., Phila., Pa., 12 pp. (p. 11 pert.).

Cohn et al.: J. A. C. S., 1950, pp. 465–474.

Tullis: "Blood Cells and Plasma Proteins — Their State in Nature," 1953, Academic Press Inc., N. Y. C. pp. 33–38, 41 and 42.

Peck et al. in J. Am. Chem. Soc., vol. 68, May 1946, pp. 772–776.

Peck et al. in J. Am. Chem. Soc., vol. 68, August 1946, pp. 1460–1462.

Ford in J. Am. Chem. Soc., vol. 70, March 1948, pp. 1223–1225.

Strain: "Chromatographic Separations" in Analytical Chem., vol. 21, January 1949, pp. 75–81.

Waksman on Neomycin in Science, Mar. 25, 1949, vol. 109, pp. 305–307.

Swart on Neomycin in Arch. of Biochem., vol. 24, November 1949, pp. 92–103.